United States Patent
Jagana et al.

(10) Patent No.: US 9,401,954 B2
(45) Date of Patent: Jul. 26, 2016

(54) SCALING A TRUSTED COMPUTING MODEL IN A GLOBALLY DISTRIBUTED CLOUD ENVIRONMENT

(71) Applicant: International Business Machines Corporation, Armonk, NY (US)

(72) Inventors: Venkata R. Jagana, Bangalore (IN); Srinivasa R. Mangipudi, Hyderabad (IN); Neil I Readshaw, Parkwood (AU); Karthik Sivakumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 14/073,234

(22) Filed: Nov. 6, 2013

(65) Prior Publication Data

US 2015/0127795 A1    May 7, 2015

(51) Int. Cl.
*G06F 15/16* (2006.01)
*H04L 29/08* (2006.01)
(Continued)

(52) U.S. Cl.
CPC ............... *H04L 67/10* (2013.01); *G06F 21/57* (2013.01); *H04L 67/34* (2013.01); *H04L 41/5096* (2013.01); *H04L 63/12* (2013.01); *H04L 63/20* (2013.01)

(58) Field of Classification Search
CPC ............ G06F 11/0709; G06F 11/0751; G06F 11/203; G06F 21/57; H04L 67/10; H04L 67/34; H04L 63/12; H04L 63/20; H04L 41/5096
USPC .................................................. 709/223–245
See application file for complete search history.

(56) References Cited

U.S. PATENT DOCUMENTS

| 7,679,769 B2 * | 3/2010 | Yamada | H04L 67/16 358/1.15 |
| 7,761,441 B2 * | 7/2010 | Chung | G06F 17/30979 707/706 |

(Continued)

FOREIGN PATENT DOCUMENTS

| CA | 2795782 | * 12/2013 | ............. H04L 12/24 |
| WO | 2011152910 A1 | 12/2011 | |
| WO | 2012145385 A1 | 10/2012 | |

OTHER PUBLICATIONS

Bare, C.;"Attestation and Trusted Computing" Practical Aspects of Modern Cryptography, 2006; 10 pages.
(Continued)

*Primary Examiner* — David Lazaro
*Assistant Examiner* — Berhanu Shitayewoldetsadi
(74) *Attorney, Agent, or Firm* — Brown & Michaels, PC; John R Pivnichny

(57) ABSTRACT

A distributed cloud environment system comprising: a repository; a plurality of cloud managed nodes with a client program interface; a plurality of service management components with a service management component interface; a central trusted computing platform service in communication with the repository, the plurality of cloud managed nodes and the plurality of service management components, comprising: a first interface for communication with the client program interface in each of the plurality of cloud managed nodes through a first single touch point; and a second interface for communication with the service management component interface for the plurality of service management components through a second single touch point. The central trusted computing platform service manages interaction of the plurality of service management components with the plurality of cloud managed nodes, and the interaction of the plurality of cloud managed nodes with the repository.

4 Claims, 12 Drawing Sheets

(51) Int. Cl.
*G06F 21/57* (2013.01)
*H04L 12/24* (2006.01)
*H04L 29/06* (2006.01)

(56) References Cited

U.S. PATENT DOCUMENTS

| | | | |
|---|---|---|---|
| 8,341,427 B2 | 12/2012 | Auradkar et al. | |
| 8,352,941 B1* | 1/2013 | Protopopov | G06F 9/45558 718/1 |
| 8,954,987 B1* | 2/2015 | Reeves | G06F 1/32 701/468 |
| 8,972,963 B2* | 3/2015 | Baset | G06F 8/68 717/168 |
| 2001/0052006 A1* | 12/2001 | Barker | H04L 41/0213 709/223 |
| 2002/0012424 A1* | 1/2002 | Nishio | H04L 47/10 379/100.06 |
| 2002/0052941 A1* | 5/2002 | Patterson | G06F 9/5061 709/223 |
| 2002/0091918 A1* | 7/2002 | Lakshman | G06F 9/44505 713/1 |
| 2002/0100036 A1* | 7/2002 | Moshir | G06F 8/62 717/173 |
| 2003/0218631 A1* | 11/2003 | Malik | H04L 12/5815 715/739 |
| 2005/0057560 A1* | 3/2005 | Bibr | G06F 9/4443 345/418 |
| 2006/0031790 A1 | 2/2006 | Proudler et al. | |
| 2007/0043715 A1* | 2/2007 | Kaushik | G06F 17/30864 |
| 2008/0005560 A1* | 1/2008 | Duffus | G06F 21/629 713/164 |
| 2008/0049746 A1* | 2/2008 | Morrill | H04L 12/6418 370/389 |
| 2008/0205610 A1* | 8/2008 | Bishop | H04L 51/24 379/93.24 |
| 2008/0282243 A1* | 11/2008 | Seguin | G06F 9/45533 718/1 |
| 2011/0010543 A1* | 1/2011 | Schmidt | H04W 12/10 713/168 |
| 2012/0072985 A1* | 3/2012 | Davne | H04L 63/0272 726/22 |
| 2012/0203908 A1* | 8/2012 | Beaty | G06F 9/541 709/226 |
| 2012/0246472 A1* | 9/2012 | Berengoltz | G06F 11/1448 713/165 |
| 2012/0297019 A1* | 11/2012 | Ting | G06F 3/038 709/217 |
| 2013/0151400 A1 | 6/2013 | Makhotin et al. | |
| 2014/0245262 A1* | 8/2014 | Hill | G06F 8/70 717/120 |
| 2014/0324994 A1* | 10/2014 | Sun | H04L 51/04 709/206 |

OTHER PUBLICATIONS

Li, X et al. "A Trusted Computing Environment Model in Cloud Architecture" Proceedings of the Ninth International Conference on Machine Learning and Cybernetics; 2010; pp. 2843-2848.

Brown et al. "Trusted Platform-as-a-Service: A Foundation for Trustworthy Cloud-Hosted Applications" CCSW; 2011; 6 pages.

"OpenStack Compute Administration Guide"; Aug. 1, 2013; 301 pages.

* cited by examiner

SCALING A TRUSTED COMPUTING MODEL IN A GLOBALLY DISTRIBUTED CLOUD ENVIRONMENT

BACKGROUND

The present invention relates to scaling a trusted computing model in a globally distributed cloud environment, and more specifically to scaling a trusted computing model in a globally distributed cloud environment through a central trusted computing platform service integrated with service management systems.

A trusted computing (TC) platform model provides a means to ensure elevated levels of trust and integrity of an operating system (OS) running on hardware. This is particularly useful in a distributed cloud environment where users require assurance that virtual machines (VMs), which are being used to carry out tasks for the user are running on a "trusted cloud infrastructure". In other words, ensuring that a trusted hypervisor or cloud managed node of a host operating system has a kernel that has not been maliciously changed.

FIG. 1 shows a TC platform client environment 100 within a distributed cloud environment. The TC platform client environment 100 has a cloud managed node 101 (hypervisor) and a cloud managed TC platform server 110. On the cloud managed TC platform server 110 is an attestation database that includes measurements of data for devices or systems of the cloud managed node 101.

A TC platform attestation program or client program on one or more VM 102 in the cloud managed node 101 runs on a kernel module and boot loader of hype 104. The kernel module and boot loader of hype 104 provides measurements 106 of data from the boot loader, kernel, kernel modules, and configuration to the TC platform attestation program 102. A trusted platform module (TPM) processor 108 provides the certificates for digitally signing the measurements 106.

The attestation program or client program on the VM 102 sends attestation data to the attestation database 112 that includes a hash of the measurement data of OS kernel module data, boot loader programs and configurations. The attestation data may also be retrieved by the attestation program on the VM 102 from the attestation database 112 during boot time for verification.

The measurement data needs to be registered in an attestation database a first time as part of registration. During subsequent boots, the attestation program 102 can send the hash of the current measurements to compare against other measurements stored during registration in the attestation database 112 to determine if the values are the same. If values are different, there is an indication that the system parameters have essentially been tampered with, potentially through an unauthorized change and therefore, the system is classified as 'untrusted' until the discrepancies have been resolved. It should be noted that the registration of the measurement data is repeated after every authorized change to the OS parameters, including legitimate application of patches.

FIG. 2 shows the interaction of multiple cloud managed nodes 101a-101n of the TC platform client environment 100 (as shown in FIG. 1) within a distributed cloud environment with service management functions 114 and a cloud managed TC platform server 110. The service management functions 114, which includes systems for ticketing 116, patch management 118, asset management 120, and workflow and provisioning 122, require multiple touch points or integrations with the cloud managed nodes 101a-101n. Additional touch points and integration is also needed between the service management functions 114 and the TC platform server 110 including the attestation database 112 to verify measurements and other data. Therefore, if X equals the number of service management functions, and Y equals the number of host OS/TC platform client touch points, X*Y equals the number of integrations or touch points required.

The TC platform client environment 100 shown in FIGS. 1-2 creates multiple points of managing the trusted cloud computing platform from a service management perspective that is complex, inefficient and thus not scalable in a distributed delivery center model.

For example, if a user has several systems in a TC platform client environment, both physical and virtual, and the attestation database 112 receives an input to register a 'new system' along with the measurement data being supplied, the attestation database 112 cannot distinguish whether the request came from a legitimate system or not. While users often have a "whitelist" that includes an inventory of known systems stored in an asset management system, there is no connection between the whitelist and the TC platform client environment 100.

In another example, during a reboot of the host OS of the client cloud managed node 101 needs to query the TC platform server 110 to determine whether the cloud managed node or hypervisor 101 has been tampered with before starting to host guest VMs. If the attestation database 112 is down or unreachable for verification, the host OS should not reboot—but the host OS has no means of reporting the incident to a user, since there is no means to propagate incidents to an incident reporting or ticketing system within the TC platform client environment 100.

In an alternate example, when a legitimate OS patch or fix is to be rolled out to the host OS in a globally distributed cloud environment, with physical hardware stacked up across global sites supporting the trusted computing platform, the distributed cloud environment uses standardized patch management tools to automate the rollout. However, none of the patch management tools can automate the re-registration of the components of the system. At best, the automation reaches an endpoint after applying the patch and asking or attempting to force the components of the system to re-register. Therefore, the patch management system has to inefficiently 'micro manage' the TC platform client environment 100 to determine if each of the components of the systems have their patches applied and if the measurements have been re-registered.

In yet another example, since clients are often charged additionally for running VMs on a trusted cloud infrastructure (as the workloads require higher system assurance), the cloud workflow and provisioning system 122 of the service management 114 needs to determine the inventory of the trusted cloud hypervisors or cloud managed nodes 101. Then, the system has to determine whether the current state of the available host OS in the cloud managed node 101 is currently in a trusted state. If it is, then the available host OS provisions the VMs on the trusted hype. However the workflow and provisioning systems cannot perform the above steps with the TC platform systems, as there is no such integration available.

A combination of the above examples is represented in FIG. 2. FIG. 2 shows the large number of touch points/integrations required in a distributed cloud environment.

SUMMARY

According to one embodiment of the present invention, a distributed cloud environment system. The system comprising: a repository comprising data; a plurality of cloud managed nodes comprising a client program which receives and sends measurement data to the repository and a client program interface; a plurality of service management components comprising functions for managing service of the plurality of cloud managed nodes and a service management component interface; and a central trusted computing platform service in communication with the repository, the plurality of cloud managed nodes and the plurality of service management components. The central trusted computing platform service comprising: a first interface for communication with the client program interface in each of the plurality of cloud managed nodes through a first single touch point; and a second interface for communication with the service management component interface for the plurality of service management components through a second single touch point. The central trusted computing platform service manages interaction of the plurality of service management components with the plurality of cloud managed nodes, and the interaction of the plurality of cloud managed nodes with the repository.

According to another embodiment of the present invention, a method of a central trusted computing platform service managing an interaction of the plurality of service management components with a plurality of cloud managed nodes, and an interaction of a plurality of cloud managed nodes with a repository in a distributed cloud environment system. The distributed cloud environment system comprising a repository comprising data; a plurality of cloud managed nodes comprising a client program which receives and sends measurement data to the repository and a client program interface; a plurality of service management components comprising functions for managing service of the plurality of cloud managed nodes and a service management component interface; a central trusted computing platform service in communication with the repository, the plurality of cloud managed nodes and the plurality of service management components, comprising: a first interface for communication with the client program interface in each of the plurality of cloud managed nodes through a first single touch point; and a second interface for communication with the service management component interface for the plurality of service management components through a second single touch point. The method comprising the steps of: the central trusted computing platform service sending a command to the client program interface and the service management component interface to register or deregister the plurality of cloud managed nodes and the plurality of service management components; the central trusted computing platform service receiving data including at least a location, measurement data, and system data from the cloud managed nodes and the service management components; the central trusted computing platform service authenticating the data received from the plurality of cloud managed nodes and the data of the plurality of service management components by searching in the repository; if the data is authenticated, the central trusted computing platform service comparing the location data to the data in the repository to match the location of the plurality of cloud managed nodes and the plurality of service management components; and if the location matches, the central trusted computing platform registering the plurality of cloud managed nodes and the plurality of service management components as trusted or deregistering the plurality of cloud managed nodes and the plurality of service management components as trusted and storing the data received from the plurality of cloud managed nodes and the plurality of service management components in the repository.

DETAILED DESCRIPTION

Figure 1:
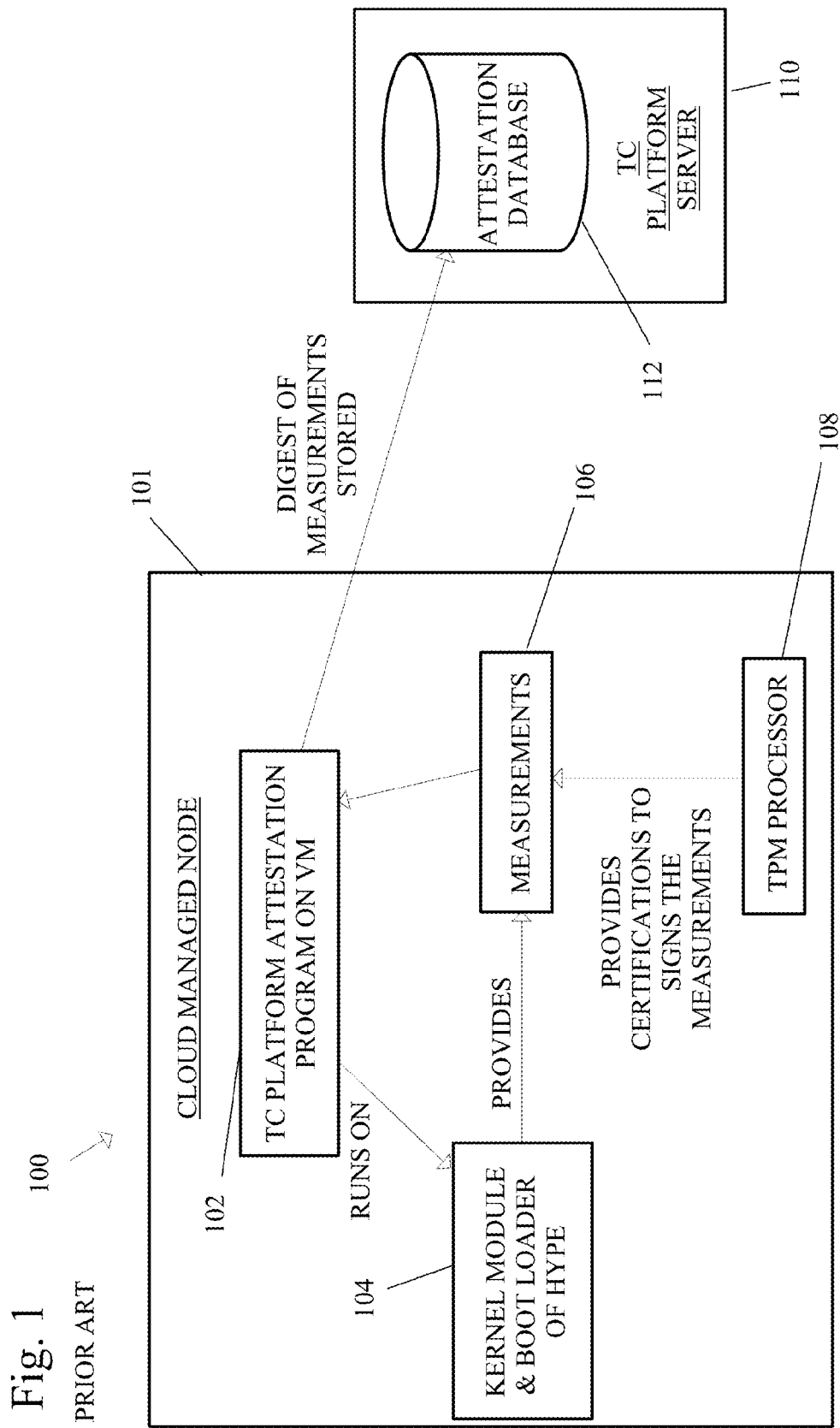
FIG. 1 shows a schematic of a trusted computing (TC) platform client environment within a distributed cloud environment.
Figure 2:
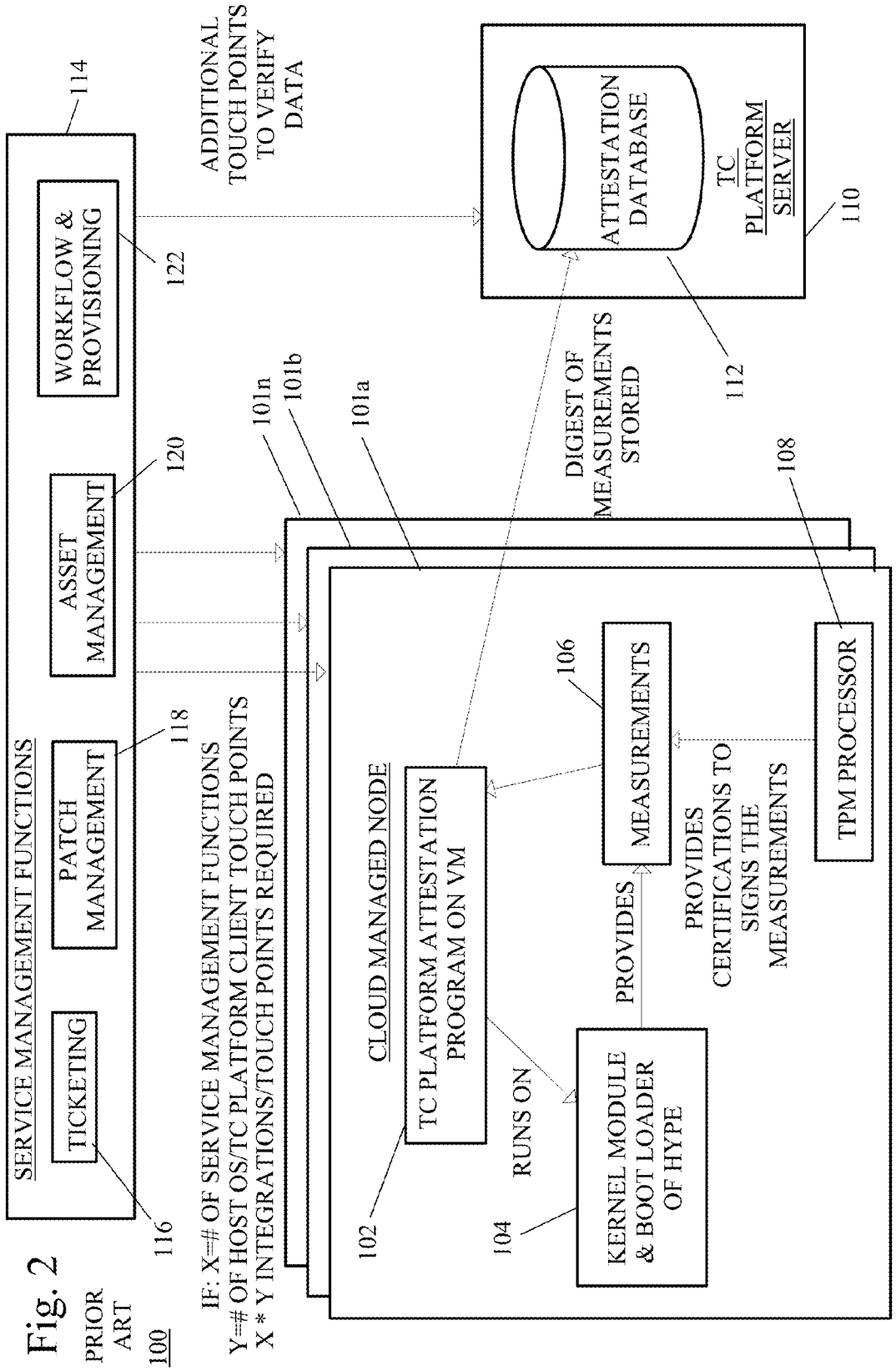
FIG. 2 shows a schematic of a combination of the conventional touch points or integrations required in a distributed cloud environment.

Cloud computing is a model of service delivery for enabling convenient, on-demand network access to a shared pool of configurable computing resources (e.g. networks, network bandwidth, servers, processing, memory, storage, applications, virtual machines, and services)that can be rapidly provisioned and released with minimal management effort or interaction with a provider of the service. This cloud model may include at least five characteristics, at least three service models, and at least four deployment models.

It will be understood that although this disclosure includes a detailed description on cloud computing, implementation of the teachings recited herein are not limited to a cloud computing environment. Rather, embodiments of the present invention are capable of being implemented in conjunction with any other type of computing environment now known (e.g. software defined environment or software defined data center) or later developed.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
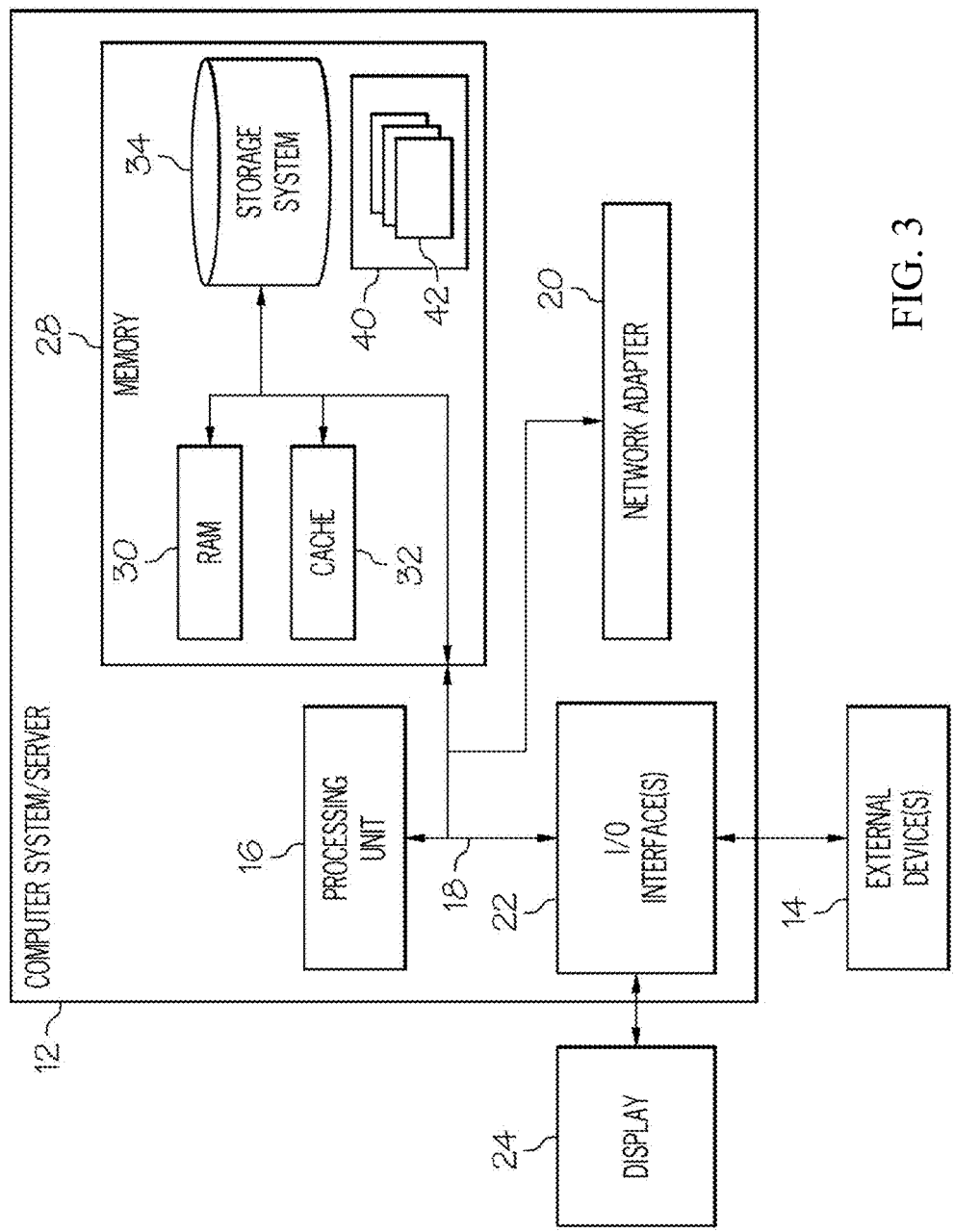
FIG. 3 shows depicts a cloud computing node according to an embodiment of the present invention

Referring now to FIG. 3, a schematic of an example of a cloud computing node is shown. Cloud computing node 10, which may be a cloud managed node 101 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12, which may be TC platform server 110, may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10, is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
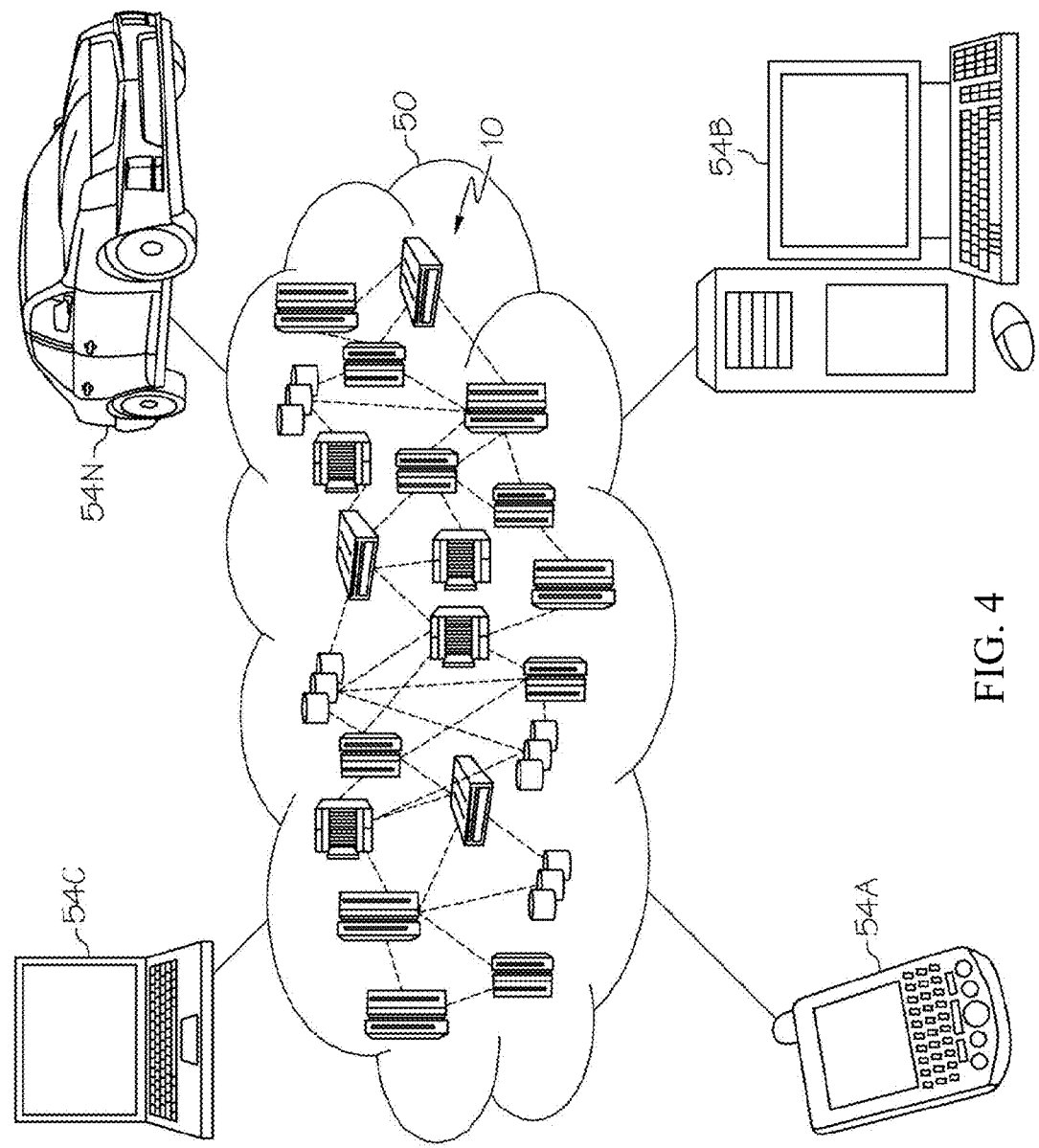
FIG. 4 shows depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
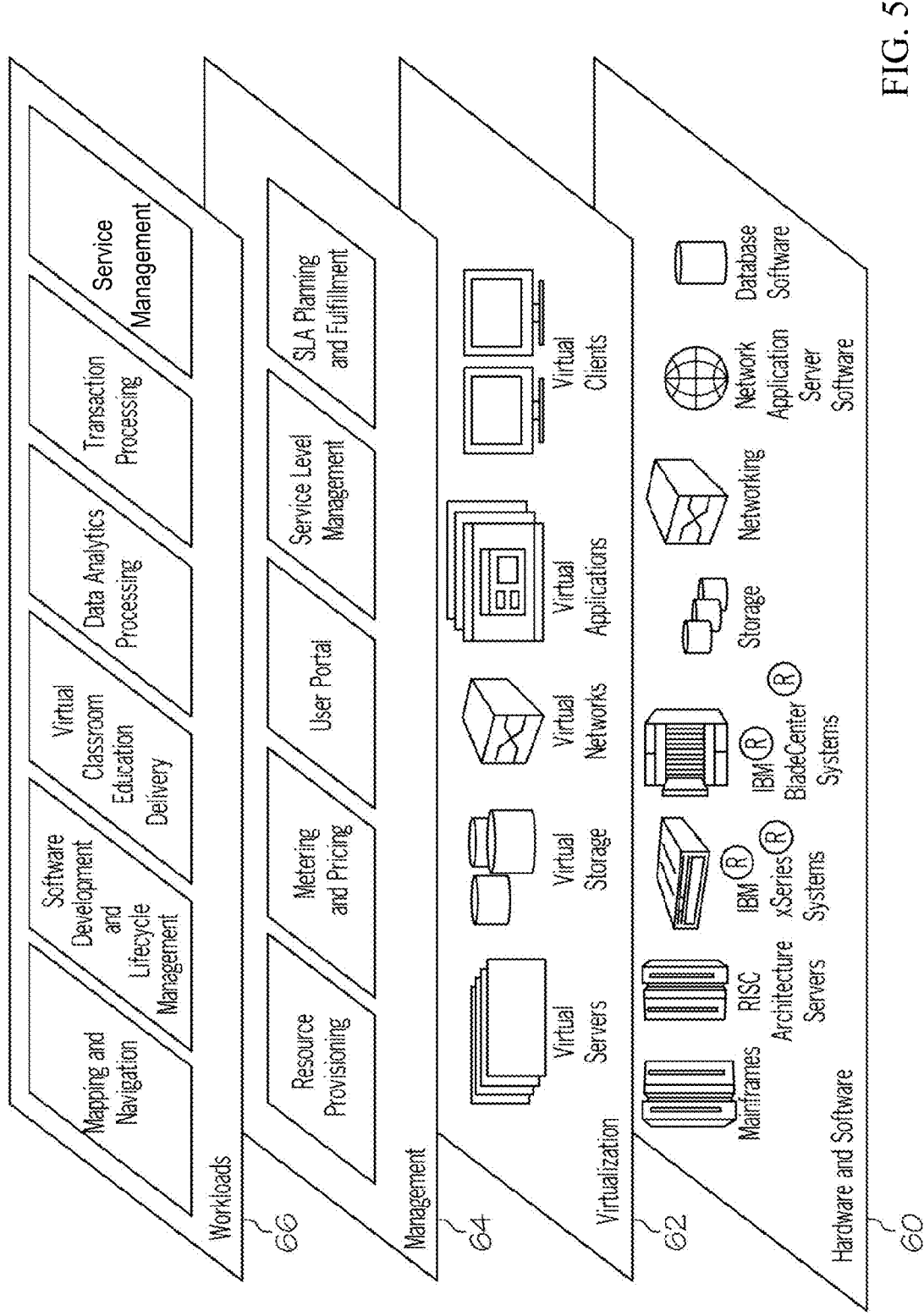
FIG. 5 shows depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and service management.

Figure 7:
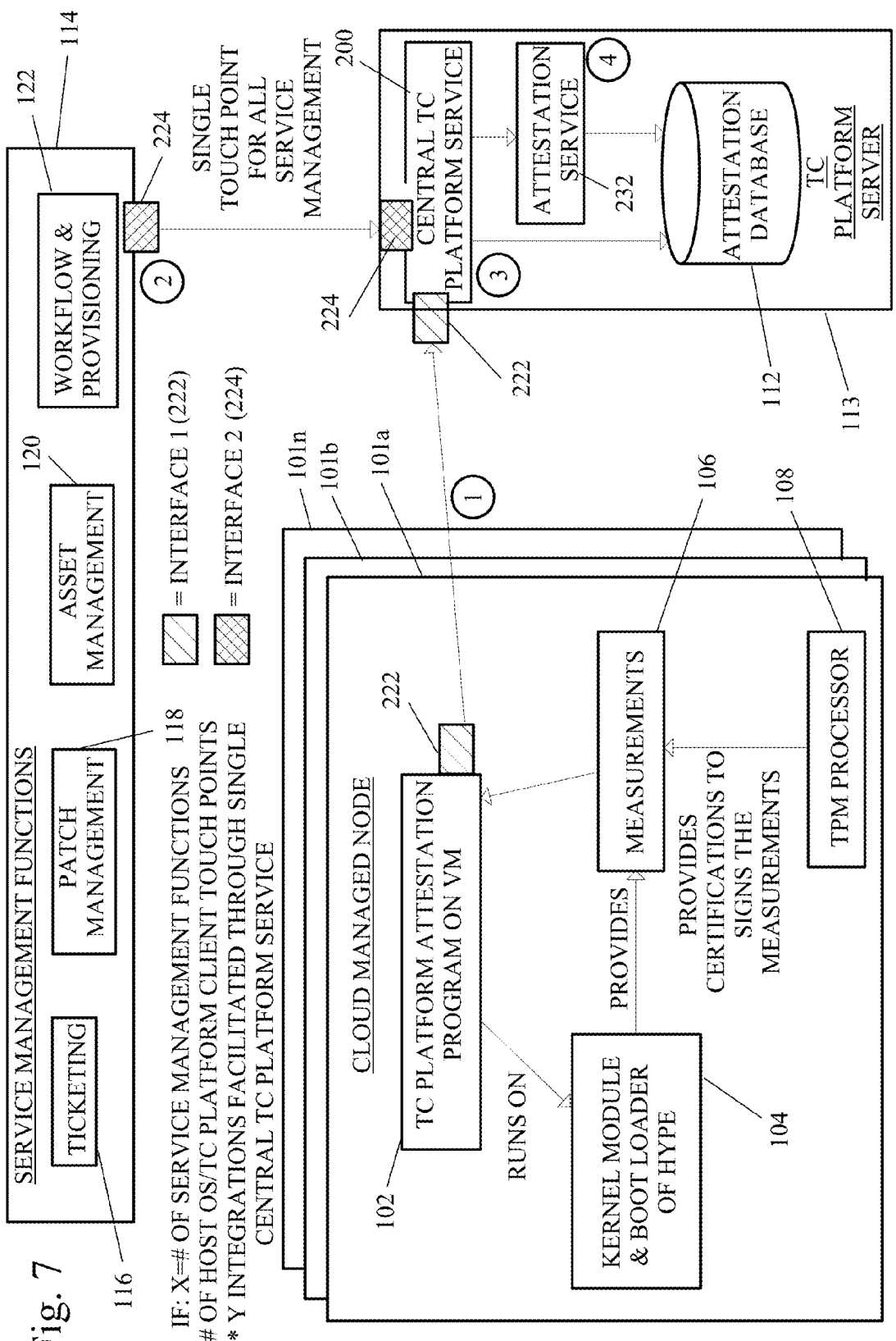
FIG. 7 shows a schematic of a central trusted computing platform service with multiple cloud managed nodes of a trusted computing (TC) platform client environment within a distributed cloud environment with service management functions, a cloud managed TC platform server and a central TC platform service of an embodiment of the present invention.

FIG. 7 shows a schematic of a central trusted computing (TC) platform service with multiple cloud managed nodes. The service is within a distributed cloud environment with service management functions. The environment also includes a cloud managed TC platform server and a central TC platform service.

The TC platform client environment as shown in FIG. 7 has a cloud managed node 101 (hypervisor) and a cloud managed TC platform server 110. On the cloud managed TC platform server 110 is an attestation database 112 that includes measurements of data for devices or systems of the cloud managed nodes 101a-101n, a central TC platform service 200, and an attestation service 232.

Figure 6:
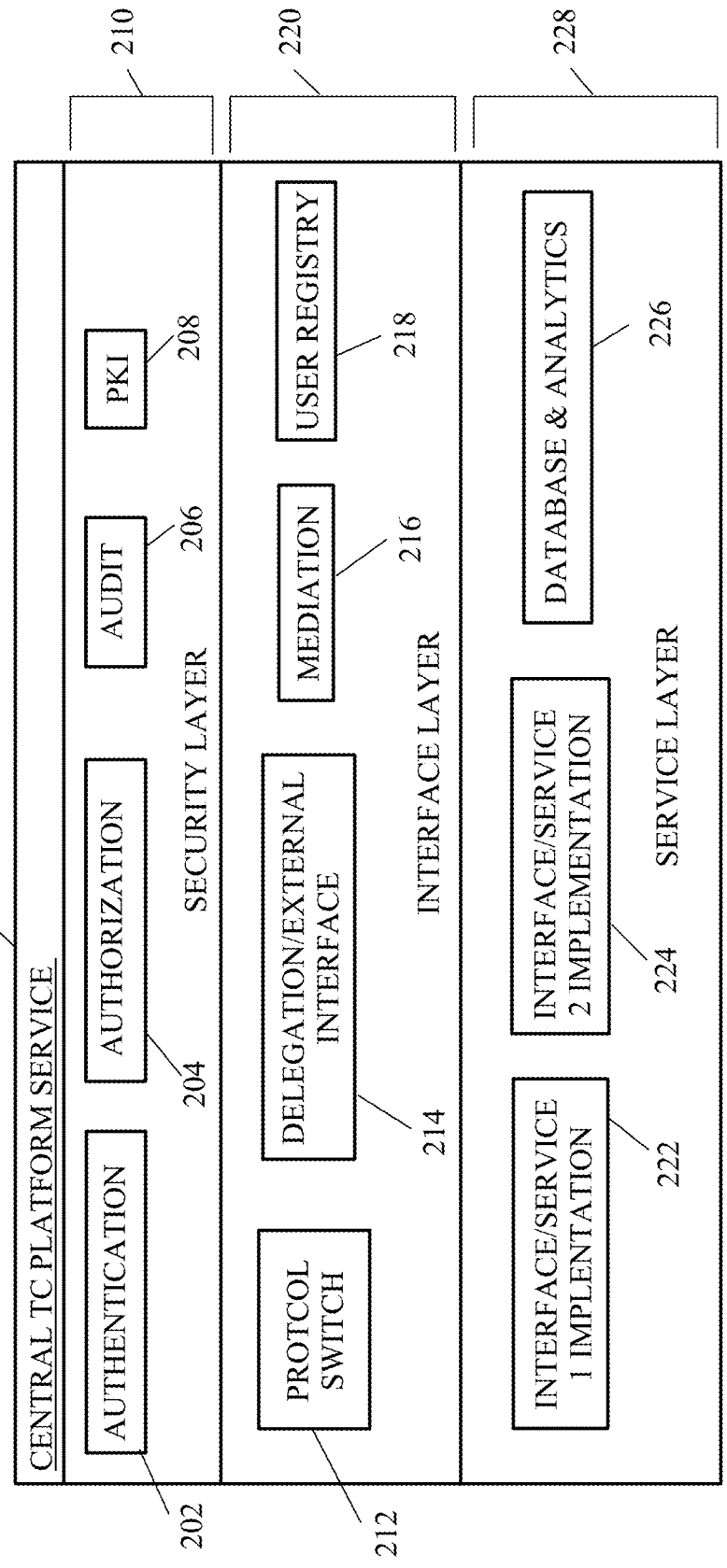
FIG. 6 shows a schematic of the components of a central trusted computing platform service of an embodiment of the present invention.

Referring to FIG. 6, the central TC platform service 200 has three layers, a security layer 210, an interface layer 220 and a service layer 228.

Within the security layer 210 are components for authentication 202, authorization 204, audit 206 and public-key infrastructure (PKI) 208.

The authentication component 202 includes programming for verification of the users with the user registry.

The authorization component 204 is configured such that only authorized users are allowed to execute service components. For example, the client, though authenticated for accessing the TC platform client environment, should not access an interface that is exposed for service management functions.

The audit component 206 keeps a log of various authentications, authorizations and administration activity of the central TC platform service 200. The audit component 206 may also store audit events in an external component such as syslog.

The PKI component 208 ensures secure communication with the trusted components (VMs) within the TC platform client environment. Public certificates from interfacing components, for example VMs, are stored on the central TC platform service 200. Other certificates might include those for the interface 222 between the cloud managed nodes (hypervisor) and the central TC platform service 200, or between the interface 224 for the TC platform server 112 and the central TC platform service 200. The public certificates may also be exported for import onto other interfacing components.

Within the interface layer 220 are components for protocol switch 212, delegation/external interface 214, mediation 216, and user registry 218.

The protocol switch component 212 provides support for a single protocol such as web service, or representational state transfer (REST) and/or supports multiple protocols through an enterprise application integration (EAI) layer, which transports and provides protocol translation functions.

The delegation/external interface component 214 allows the central TC platform service 200 to function as a service of services (SoS) and invoke services behind it such as an attestation service 232.

The mediation component 216 provides for communication between the TC platform client service 200 components and the service management components 114.

The user registry component 218 includes user registration and is populated with the credentials of users who are expected to access the service.

Within the service layer 228 are services for interfaces such as interface/service 1 implementation 222, interface/service 2 implementation 224, and a database and analytics component 226. The database and analytics component 226 provides business performance data, for example how many reboot registrations have failed over a specified duration, how many systems succeeded in re-registrations after a patch, and quality of service parameters for response of requests.

The central TC platform service 200 is located within the cloud managed server 113. The central TC platform service has a first interface/service 1 implementation 222 for communication with the TC platform attestation program or client program 102 on the VMs, as indicated by the diagonally hatched box in FIG. 7. This is the only touch point between the hypervisor or cloud managed node 101a-101n and the central TC platform service 200 in the TC platform server 113. The central TC platform service 200 has a second interface/service 2 implementation 224 for communication between the service management functions 114, indicated by the cross-hatched box in FIG. 7. This is the only touch point for all service management functions.

The central TC platform service 200 is in communication with the attestation database 112. Alternatively, an additional attestation service 232 may be in communication with the central TC platform service 200 and the attestation database 112 or alternatively, with the cloud managed nodes 101a-101n. The attestation service 232 retrieve and verify the integrity of the cloud managed nodes 101a-101n from the attestation database 112 based on stored data that may include the integrity of cloud managed nodes 101a-101n, including data regarding when the cloud managed nodes were last verified, location of the nodes 101a-101n and other metadata. From this data, the attestation service 232 can aid in selecting a cloud managed node 101a-101n that meets users' requirements. The attestation service 232 may also query the attestation database 112 for cloud managed nodes 101a-101n which meet specified criteria, for example that were validated within the last time period and verify the integrity report received from the cloud nodes 101a-101n and assign the cloud nodes 101a-101n to an integrity level as applicable.

The cloud managed nodes would assert their measurements, and the attestation service would validate these against the attestation database. The attestation database would also then store data about the integrity of nodes, such as when they were last checked, location of the node and other metadata. The attestation service could then also query the attestation database for nodes which meet criteria, e.g. validated within the last time period The TC platform attestation program or client program 102 on VMs of the cloud managed node 101 runs on a kernel module and boot loader of hype 104. The kernel module and boot loader of hype 104 provides measurements 106 of data from the boot loader, kernel, kernel modules & configuration to the TC platform attestation program or client program 102. A trusted platform module (TPM) processor 108 provides the certificates for digitally signing the measurements 106.

The attestation program or client program 102 on the VMs sends attestation data that includes a hash of the measurement data of OS kernel module data, boot loader programs and configurations to the central TC platform service 200. The central TC platform service 200 may communication the attestation data directly to the attestation database 112 or to a attestation service 232, which then communicates the data to the attestation database 112.

It should be noted that in an illustrated embodiment of the present invention, the central TC platform service 200 provides a limited number of touch points between the service management functions 114, the cloud managed nodes 101a-101n and the TC platform server 113.

The touch points are indicated in FIG. 7 as numbers inside of the circles. There is a single touch point, shown as touch point 2, for all service management functions 114 between the central TC platform service 200 and the service management function 114, a single touch point, shown as touch point 1, between the cloud managed nodes 101a-101n and the central TC platform service 200, and a single touch point, shown as touch point 3, between the central TC platform service 200 and the attestation database 112.

Alternatively, instead of single touch point 3 between the central TC platform service 200 and the attestation database 113, an additional or alternative touch point, shown as touch point 4, may be present between the central TC platform service 200 and an attestation service 232. Therefore, if X is the number of service management functions, and Y is the number of host OS/TC platform client touch points, then X+Y is the number of integrations facilitated through a single central TC platform service.

In another illustrative embodiment, it is recognized that each of the service management functions 114, the systems for workflow and provisioning 122, asset management 120, patch management 118, ticketing 116, are in communication with the central TC platform service 200 and not an endpoint.

In another illustrative embodiment, it is recognized that the central TC platform service 200 is a focal point for interaction with all of the TC platform attestation programs or client programs 102.

In another illustrative embodiment, it is recognized that the central TC platform service 200 may function as a 'service of services' or 'wrapper service' and contain services such as an attestation service 232.

In another illustrative embodiment, it is recognized that the central TC platform service 200 is highly available and distributed across global delivery center sites for better uptime and serviceability.

In another illustrative embodiment, it is recognized that the service management functions 114 need not register, know or integrate with all TC platform client touch points in the distributed cloud environment, which can number into the thousands, saving on integration, interfaces, code and dependency created between the service management systems and the TC platform client programs, and reducing the development and service costs to manage such an integration.

Figure 8:
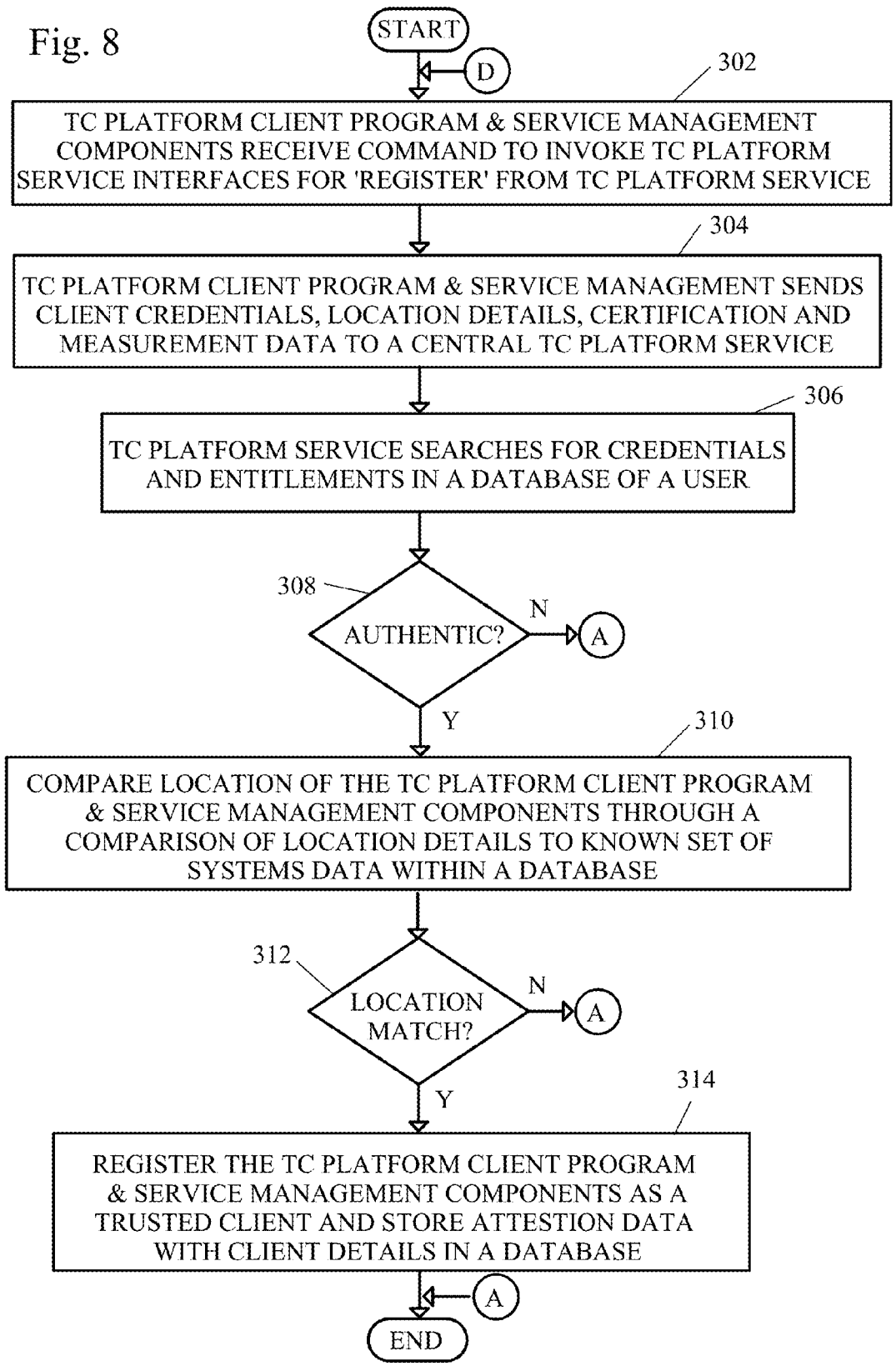
FIG. 8 shows a flow diagram of a method of registration of the computing nodes with a central TC platform service of an embodiment of the present invention.

FIG. 8 shows a flow diagram of a method of registration of the computing nodes with a central TC platform service of an embodiment of the present invention.

In a first step, the TC platform client program or attestation program 102 and service management components 114 receive a 'register' command to invoke TC platform service interfaces 222, 224 (step 302).

The TC platform client program or attestation program 102 and service management 114 sends client credentials, location details, certification, and attestation data/measurement data to a central TC platform service 200 through a single touch point (step 304).

The TC platform client program or attestation program 102 sends the data through a single touch point to the central TC platform service 200 through a first interface 222, and the service management 114 sends the data for all of the components within the service management through a single touch point to the central TC platform service 200 through a second interface 224.

The client credentials, location details, certification, and attestation data/measurement data may be used within the user registry component 218 of the central TC platform service 200 to set the authentication of the service management agents running on the hosts or users through the authentication component 202, to setup public certificates through the PKI component 208, to initialize the audit component 206, and to establish that users have authorization through the authorization component 204.

The central TC platform service 200 searches for credentials and entitlements of a user in a database, for example the user registry component 218 or some other database, through the authorization component 204 (step 306).

If the credentials and entitlements for the user are not authenticated (step 308), for example through the authentication component 202 of the TC platform central service 200, communication to the central TC platform service 200 would fail and the method ends. Prior to the method ending, an error message may be written to a log. An alert or incident report may also be generated by the lack of contact between the cloud managed node and the central TC platform service and would be investigated further as appropriate.

If the credentials and entitlements for the user are authenticated (step 308), for example through the authentication component 202 of the TC platform central service 200, than the locations of the TC platform client program 200 and service management components 114 are compared to a known set of systems data within a database (step 310), for example the attestation database 113 or another database.

If the locations do not match (step 312), communication to the central TC platform service 200 would fail and the method ends. Prior to the method ending, an error message may be written to a log. An alert or incident report may also be generated by the lack of contact between the cloud managed node and the central TC platform service and would be investigated further as appropriate.

If the locations match (step 312), the TC platform client program or attestation program 102 and service management components 114 are registered as trusted and the attestation data with client details from the TC platform client program 102 is stored in a database (step 314), for example the attestation database 112 and the method ends.

Figure 9:
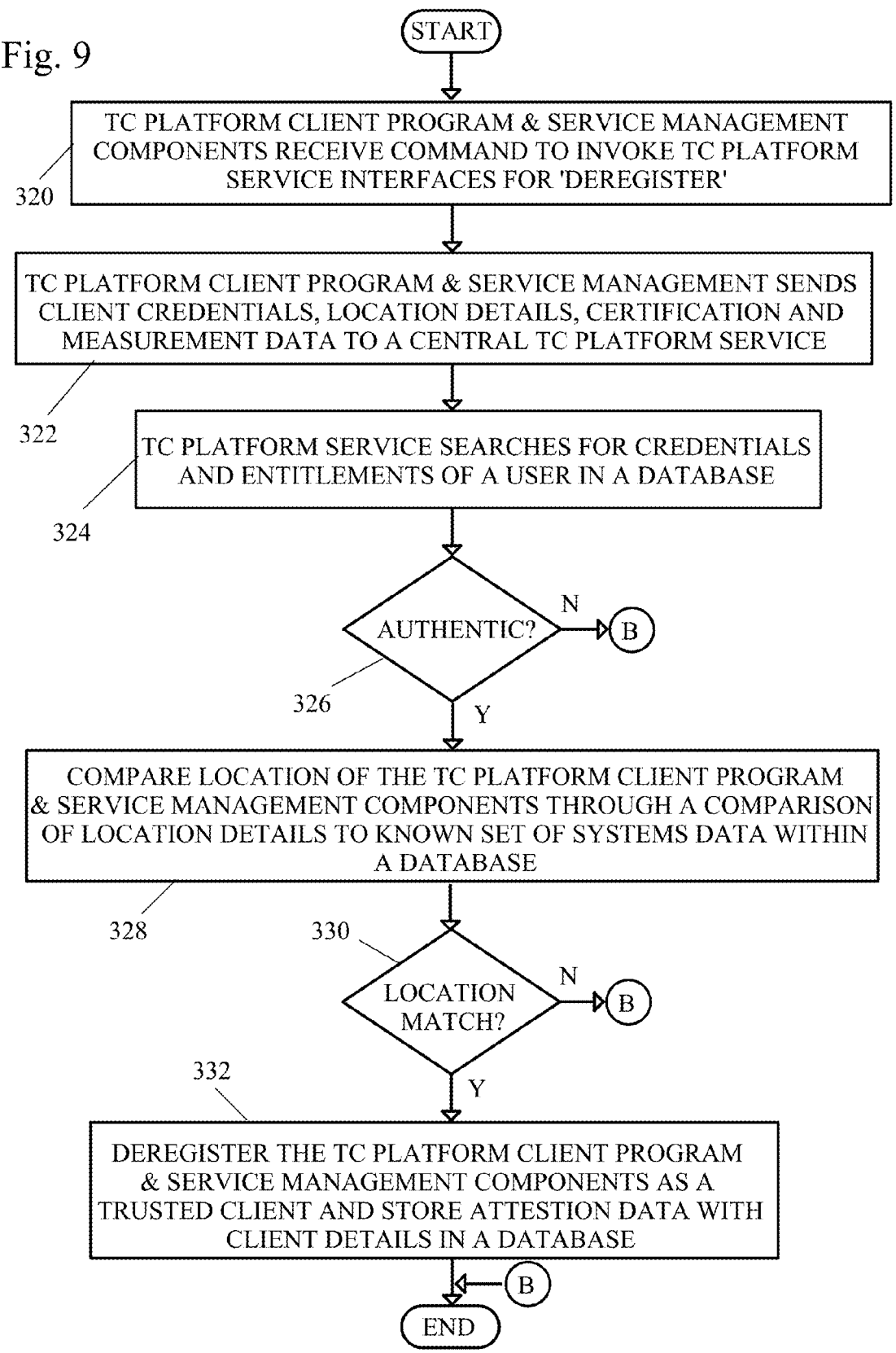
FIG. 9 shows a flow diagram of a method of deregistration of the computing nodes with a central TC platform service of an embodiment of the present invention.

FIG. 9 shows a flow diagram of a method of deregistration of the computing nodes with a central TC platform service of an embodiment of the present invention.

In a first step, the TC platform client program or attestation program 102 and service management components 114 receive a 'deregister' command to invoke TC platform service interfaces 222, 224 (step 320).

The TC platform client program or attestation program 02 and service management 114 sends client credentials, location details, certification, and attestation data/measurement data to a central TC platform service 200 through a single touch point (step 322).

The TC platform client program or attestation program 102 sends the data through a single touch point to the central TC platform service 200 through a first interface 222 and the service management 114 sends the data for all of the components within the service management through a single touch point to the central TC platform service 200 through a second interface 224.

The client credentials, location details, certification, and attestation data/measurement data may be used within the user registry component 218 of the central TC platform service 200, to determine the authentication of the users through the authentication component 202.

The central TC platform service 200 searches for credentials and entitlements of a user in a database, for example the user registry component 218 or some other database, through the authorization component 204 (step 324).

If the credentials and entitlements of the user are not authenticated (step 326), for example through the authentication component 202 of the TC platform central service 200, communication to the central TC platform service 200 would fail, the client programs are not deregistered and the method ends. Prior to the method ending, an error message may be written to a log. An alert or incident report may also be generated by the lack of contact between the cloud managed node and the central TC platform service and would be investigated further as appropriate.

If the credentials and entitlements of the user are authenticated (step 326), for example through the authentication component 202 of the TC platform central service 200, than the locations of the TC platform client program 200 and service management components 114 are compared to a known set of systems data within a database (step 328), for example the attestation database 113 or other database.

If the locations do not match (step 330), communication to the central TC platform service 200 would fail and the method ends. Prior to the method ending, an error message may be written to a log. An alert or incident report may also be generated by the lack of contact between the cloud managed node and the central TC platform service and would be investigated further as appropriate.

If the locations match (step 330), the TC platform client program or attestation program 102 and service management components 114 are deregistered as trusted and the attestation data with client details from the TC platform client program 102 is stored in a database as being deregistered (step 332), for example the attestation database 112.

Figure 10:
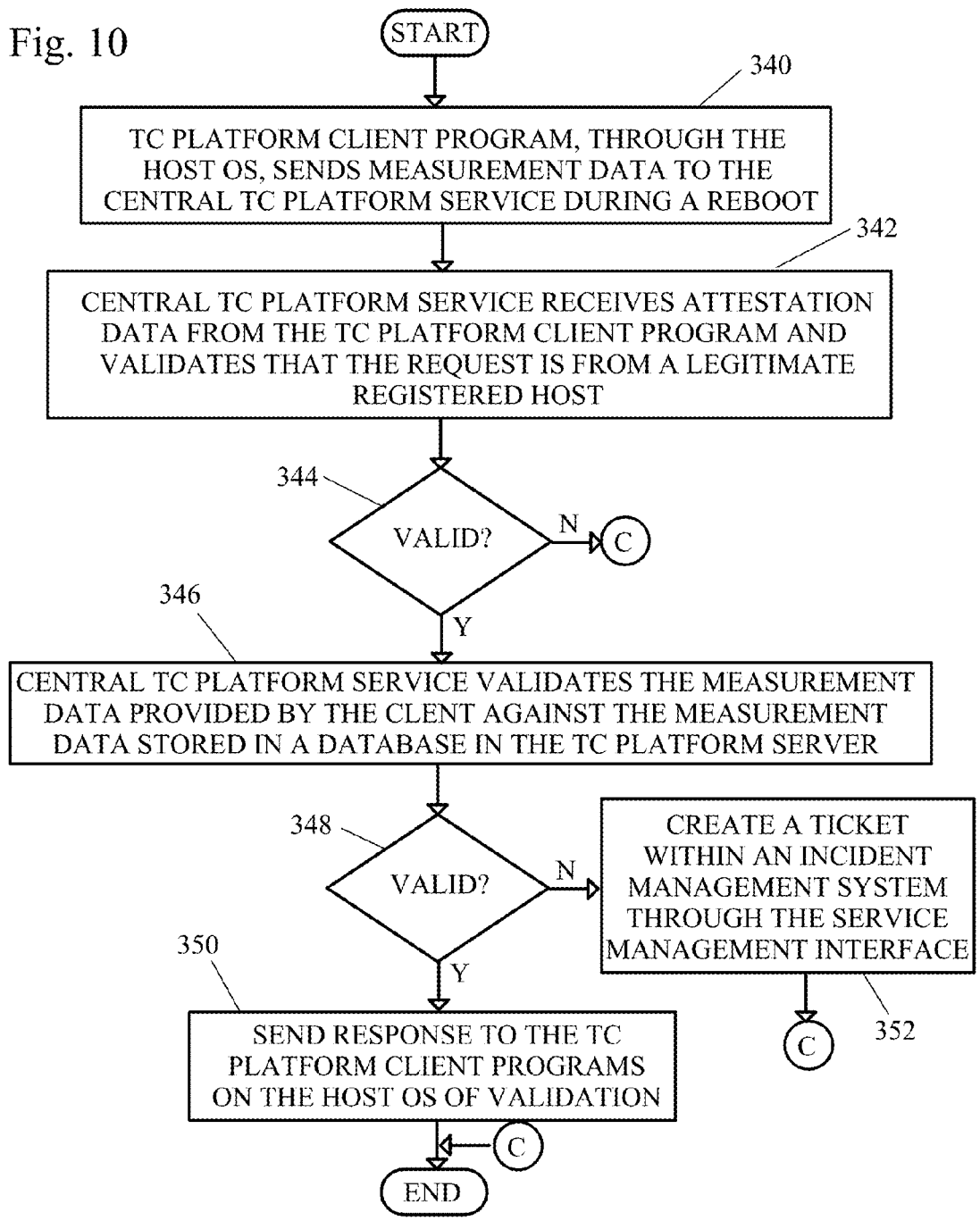
FIG. 10 shows a flow diagram of a method of validation of the attestation program or client programs of the hypervisor or cloud managed node during reboot, using a central TC platform service of an embodiment of the present invention.

FIG. 10 shows a flow diagram of a method of validation of the attestation program or client programs of the hypervisor or cloud managed node during reboot, using a central TC platform service of an embodiment of the present invention.

In a first step, the TC platform client program or attestation program 102, sends attestation data through the host OS to the central TC platform service 200 during a reboot (step 340). A hash of the attestation data or measurement data is sent through a single touch point between the attestation program or client program on the cloud computing node 101a-101n and the central TC platform service 200.

The central TC platform service 200 receives the attestation or measurement data from the TC platform client program and validates that the request is from a legitimate registered host of a cloud managed node 101a-101n (step 342), for example through the authentication and authorization components 202, 204.

If the registered host is not valid or legitimate (step 344), the attestation database would be updated to record that an invalid measurement was recorded by the cloud managed node (step 345) and communication to the central TC platform service 200 would fail and the method ends. The update to the attestation database ensures that a potentially compromised cloud managed node is not selected for additional workloads. If the system has a strict policy, the host may be prevented from booting. If the system has a loose policy, the invalid host may be allowed to boot, but an alert or incident may be generated through incident management in the ticketing system 116 for investigation.

If the registered host is valid or legitimate (step 344), than the central TC platform service 200 validates the attestation data or measurement data provided by the client program 102 against the measurement data stored in a database on the TC platform server 113, for example the attestation database (step 346).

If the measurement data provided is not valid, or not the same as the measurement data in the attestation database (step 348), the central TC platform service 200 creates a ticket with incident management in the ticketing system 116 through the service management interface 224 (step 352). For example an error message may be written to a log or an alert or incident report may also be generated by the lack of contact between the cloud managed node and the central TC platform service and would be investigated further as appropriate.

If the measurement data is valid or the same as the measurement data in the attestation database (step 348), the central TC platform service 200 sends a response to the TC platform client programs 102 on the host OS of validation (step 350) and the method ends.

Figure 11:
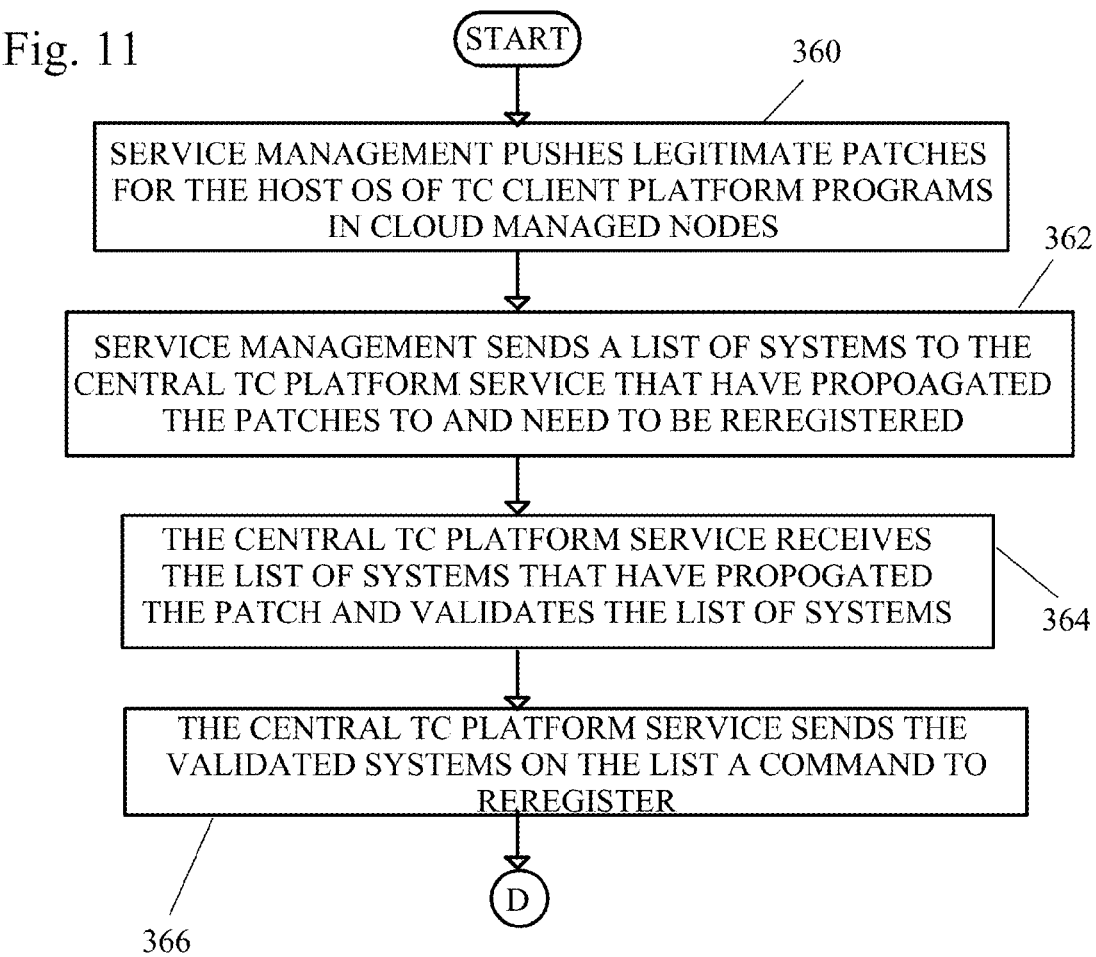
FIG. 11 shows a flow diagram of a method of patch management through the central TC platform service of an embodiment of the present invention.

FIG. 11 shows a flow diagram of a method of patch management through the central TC platform service of an embodiment of the present invention.

In a first step, service management pushes legitimate patches for the host OS of the TC platform program in the cloud managed nodes 101a-101n (step 360). The service management functions 114 handle patches through a patch management system 118.

The service management 114 sends a list of systems in the cloud managed nodes 101a-101n, for example through interface 224, to the central TC platform service 200 that have propagated the patches and need to be re-registered (step 362).

The central TC platform service 200 receives the list of systems that have propagated the patch and validates the list of systems (step 362), for example through the authentication component 202.

The central TC platform 200 service sends the validated systems present on the list a command to re-register, for example through the interface 222 and the method repeats the steps of 302-314 of FIG. 8.

Figure 12:
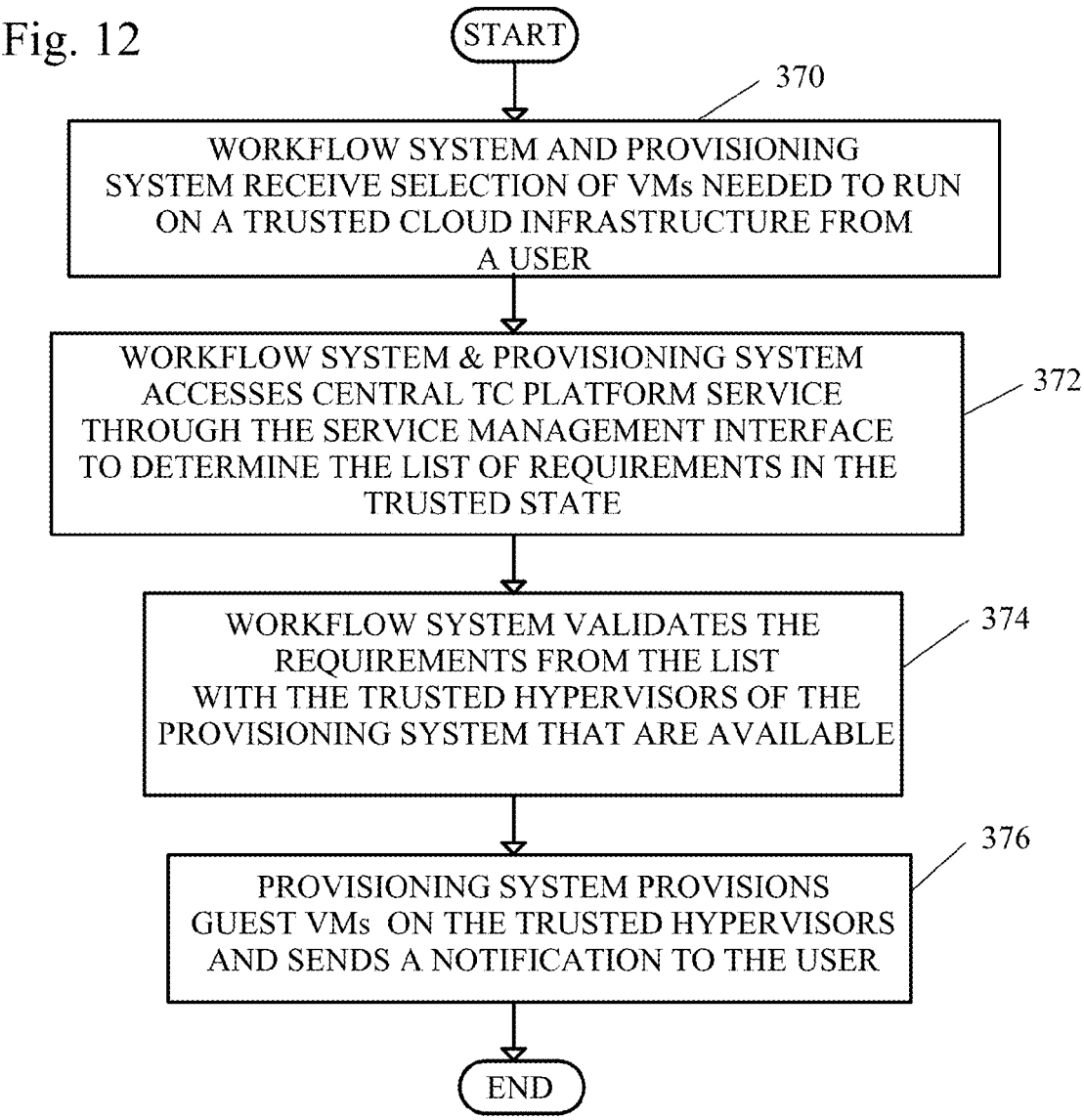
FIG. 12 shows a flow diagram of a method of provisioning virtual machines within the cloud computing node through the central TC platform service of an embodiment of the present invention.

FIG. 12 shows a flow diagram of a method of provisioning virtual machines within the cloud computing node through the central TC platform service of an embodiment of the present invention.

In a first step, a cloud workflow system and provisioning system receive a selection of VMs needed to run on a trusted cloud environment from user (step 370).

A workflow system and provisioning system 122 of the service management 114 accesses the central TC platform service 200 through the service management interface 224 to determine a list of requirements for the client managed nodes and associated VMs in the trusted state (step 372).

The workflow system validates the requirements for the VMs from the list of trusted cloud managed nodes that are available for immediate use (step 374).

The cloud provisioning system provisions the available VMs on the trusted cloud managed nodes and sends notification to the user (step 376) and the method ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A distributed cloud environment system comprising:
 a repository comprising data; a plurality of cloud managed nodes comprising a client program which receives and ends measurement data to the repository and a client program interface;
 a plurality of service management components comprising functions for managing service of the plurality of cloud managed nodes and a service management component interface; and
 a central trusted computing platform service in communication with the repository, the plurality of cloud managed nodes and the plurality of service management components, comprising:
 a first interface for communication with the client program interface in each of the plurality of cloud managed nodes through a first single touch point; and a second interface for communication with the service management component interface for the plurality of service management components through a second single touch point;

wherein the central trusted computing platform service manages interaction of the plurality of service management components with the plurality of cloud managed nodes, and the interaction of the plurality of cloud managed nodes with the repository;

wherein an interaction managed by the central trusted computing platform is registration of the client program of the plurality of cloud managed nodes and the plurality of service management components by the steps of:

the central trusted computing platform service sending a command to the client program interface and the service management component interface to register the plurality of cloud managed nodes and the plurality of service management components;

the central trusted computing platform service receiving data including at least a location, measurement data, and system data from the cloud managed nodes and the service management components;

the central trusted computing platform service authenticating the data received from the plurality of cloud managed nodes and the data of the plurality of service management components by searching in the repository;

if the data is authenticated, the central trusted computing platform service comparing the location data to the data in the repository to match the location of the plurality of cloud managed nodes and the plurality of service management components; and if the location matches, the central trusted computing platform registering the plurality of cloud managed nodes and the plurality of service management components as trusted and storing the data received from the plurality of cloud managed nodes and the plurality of service management components in the repository.

2. The system of claim 1, further comprising an attestation service in communication with the central trusted computing platform service and the repository.

3. The system of claim 1, wherein the plurality of service management components are selected from a group consisting of a ticketing system, a patch management system, an asset management system, a workflow system and a provisioning system.

4. The system of claim 1, wherein the central trusted computing platform service further comprises:

a security layer comprising at least one of an authentication component, an authorization component, an audit component, and a public-key infrastructure component;

an interface layer comprising at least one of a protocol switch component, a delegation interface component, mediation component, and an user registry component; and a service layer comprising at least one of a first interface service implementation component, a second interface service implementation component, and a repository and analytics component.

* * * * *